Dec. 27, 1938.  C. DOERING  2,141,462
CHILLING DEVICE FOR DAIRY PRODUCTS AND THE LIKE
Filed Sept. 12, 1936  2 Sheets-Sheet 1
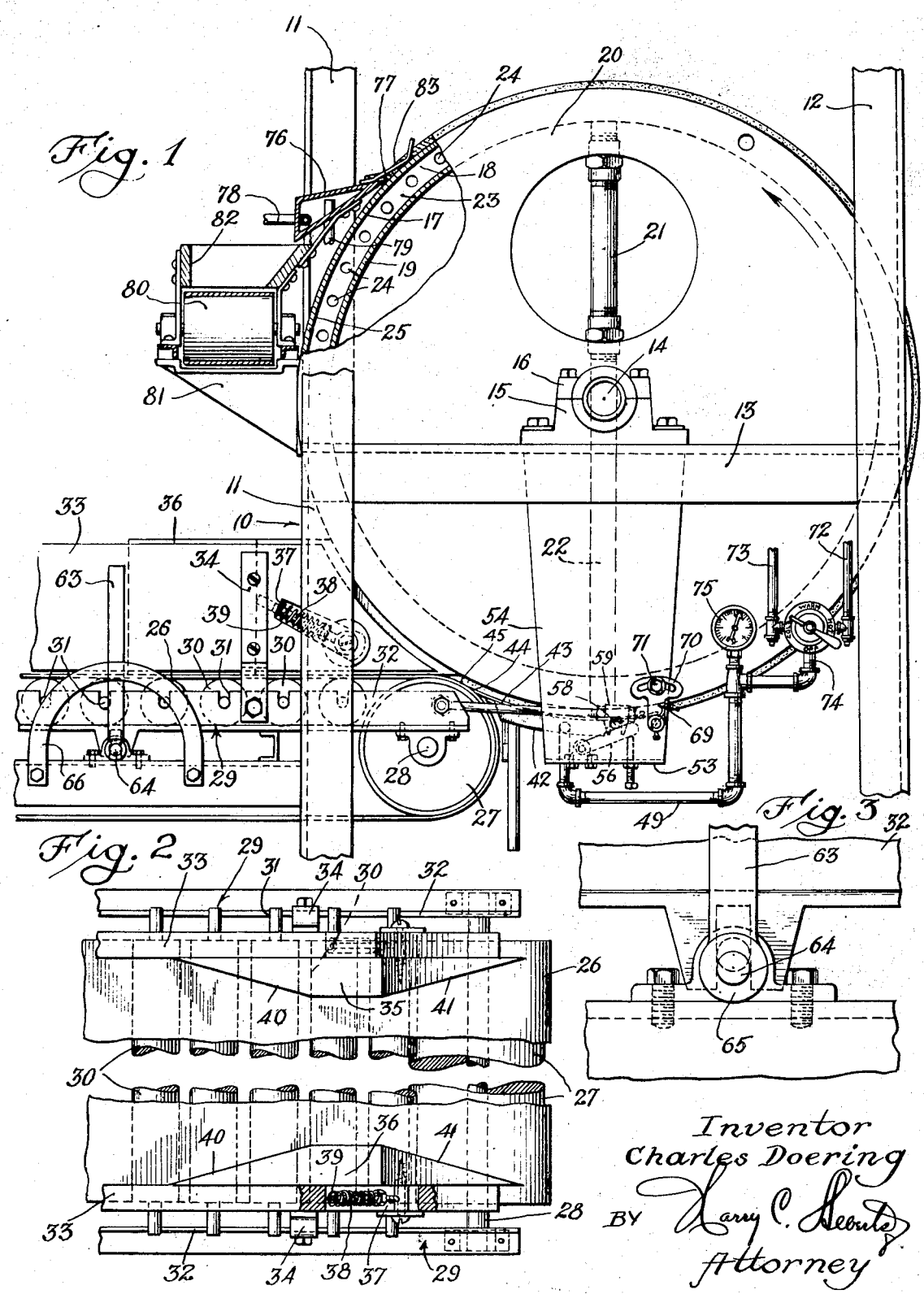
Inventor
Charles Doering
BY
Attorney Dec. 27, 1938.   C. DOERING   2,141,462
CHILLING DEVICE FOR DAIRY PRODUCTS AND THE LIKE
Filed Sept. 12, 1936   2 Sheets-Sheet 2
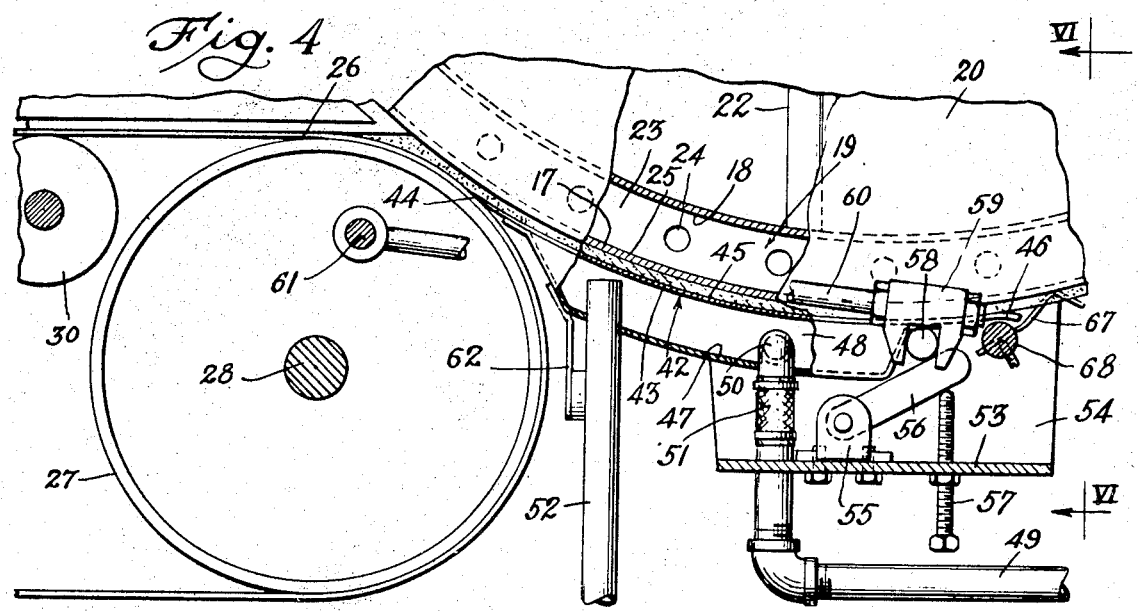
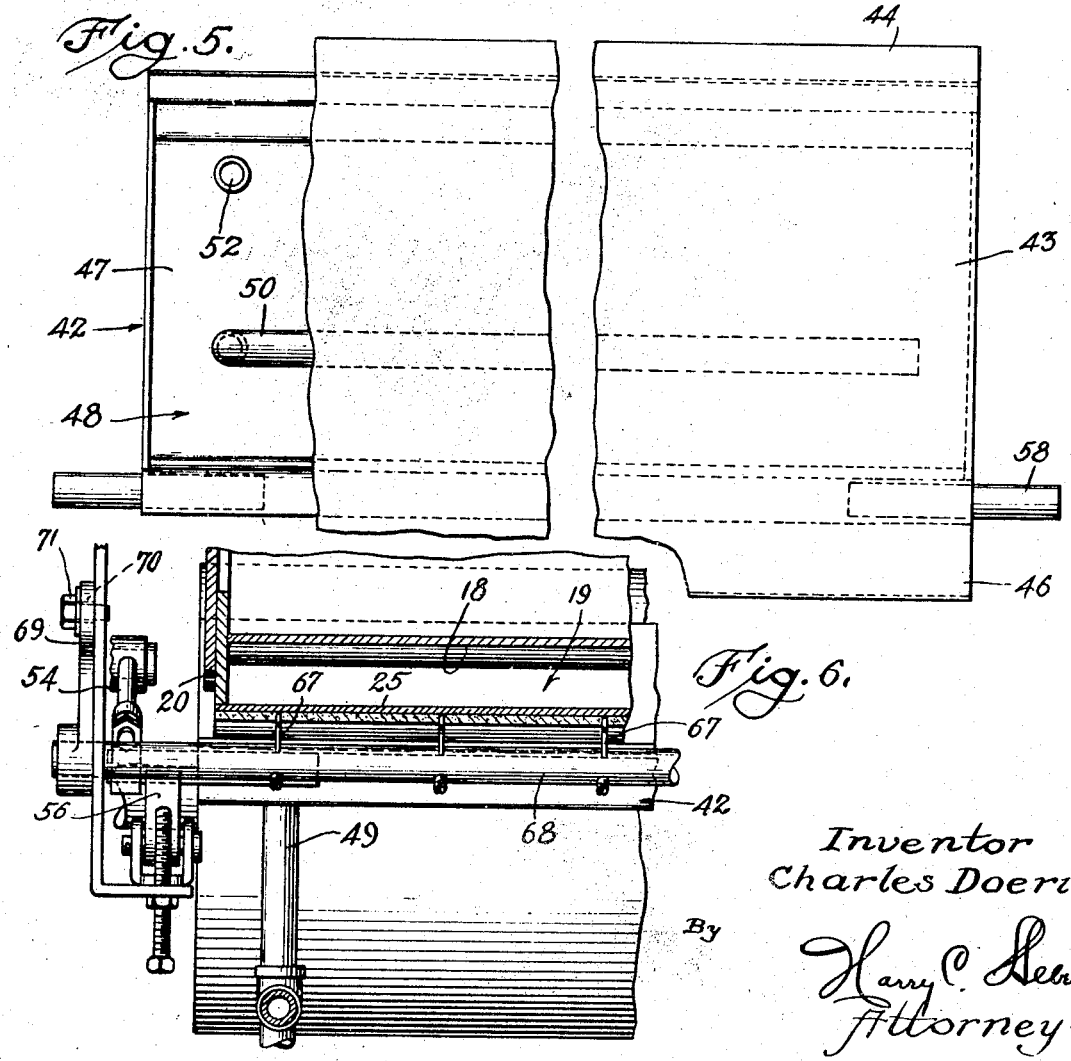
Inventor
Charles Doering Patented Dec. 27, 1938

2,141,462

UNITED STATES PATENT OFFICE 2,141,462

CHILLING DEVICE FOR DAIRY PRODUCTS AND THE LIKE

Charles Doering, Chicago, Ill., assignor of one-half to Henry Doering, Chicago, Ill.

Application September 12, 1936, Serial No. 100,505

18 Claims. (Cl. 62—114)

This invention relates to chilling devices and more particularly to dairy product chilling machines, although it may be employed with equal advantage for other purposes.

It contemplates more especially the provision of improved means for solidifying or hardening normally liquid or plastic substances directly from the churn or other producing devices.

It has heretofore been the practice of subjecting normally unstable substances to refrigeration prior to packaging or otherwise preparing such for eventual consumption. This involves the placement of freshly produced edible substances into a hardening room which requires considerable time for solidifying the substances and maintaining such against deterioration. Not only is a great deal of time entailed in hardening such substances for preservation and sale, but these become unevenly solidified in that the body proximate to the surface becomes much colder than the interior to the extent that normally liquid and plastic edible products such as butter, eggs, and the like become mottled, non-uniform in texture, and lack homogeneity to the extent that the interior is not always maintained fresh nor free from deterioration.

One object of the present invention is to provide means for hardening plastic edible substances uniformly throughout the body thereof.

Another object is to provide means for hardening successive increments of plastic products so as to effect their solidification uniformly and homogeneously.

Still another object is to provide improved means for transferring substances to a refrigerated surface for hardening and chilling.

A further object is to provide improved instrumentalities for transferring edible substance to and from a refrigerated surface to effect the chilling and hardening thereof for preservation.

A still further object is the provision of an improved transfer pan for a chilling machine to effect the delivery and discharge of normally liquid or plastic edible substances for refrigeration and conversation to a solid state.

Still a further object is to provide means for uniformly treating successive increments of plastic substances without entailing any appreciable time or labor and effecting their accumulation into a uniformly blended and homogeneously solidified mass.

Other objects and advantages will appear from the following description of an illustrative embodiment of the present invention.

In the drawings:

Figure 1 is a fragmentary side view in elevation of a device embodying features of the present invention, parts thereof being shown in section to clarify the showing.

Figure 2 is a fragmentary plan view of a conveyor device utilized to feed edible substances to the refrigerator roll shown in Figure 1.

Figure 3 is a front detail view in elevation of the conveyor positioning device shown in Figure 1.

Figure 4 is a fragmentary sectional view in elevation of the refrigerator roll, feeding conveyor and of the transfer pan disposed therebetween.

Figure 5 is a fragmentary detail plan of the transfer pan shown in Figure 4.

Figure 6 is a fragmentary sectional view in elevation taken substantially along the line VI—VI of Figure 4.

The structure selected for illustration comprises a frame 10 embodying beams 11 and 12 that are in spaced horizontal parallelism for support by horizontal beams 13 that serve as a part of the frame 10 to constitute an instrumentality supporting structure as will appear more fully hereinafter. A shaft 14 is supprted by the horizontal beam members 13 which are provided with split bearings 15—16 for journalled support of the shaft 14. The shaft 14 carries a comparatively large cylindrical member such as a drum 17 that is fixed to the shaft 14 for rotation therewith between the horizontal beam members 13.

The drum 17 presents a large circumferential surface that is refrigerated in any suitable manner as commercial practice may dictate. In this instance, the drum 17 is refrigerated by providing a comparatively narrow chamber 18 interiorly thereof owing to the provision of a somewhat smaller drum 19 concentrically positioned therein for rotation therewith owing to its attachment to the shaft 14. It is to be noted that the refrigerated chamber or space 18 extends around to the sides 20 of the external drum 17 in that the internal drum 19 is uniformly smaller and of corresponding shape to present a refrigerating chamber 18 throughout the surface extent thereof for communication with an inlet conduit 21 and a discharge conduit 22 connected to the shaft 14 that is partially tubular to present axial passages proximate to both ends of the shaft 14 for connection to the conduits 20—21.

It will be apparent, therefore, that any suitable refrigerant such as a refrigerated brine solution may be introduced through the refrigerant space 18 with the conduits 21 and 22 as intermediate connectors. For that matter, the direction of refrigerant flow or the circulation thereof may be reversed, it only being important to bring the refrigerant in contact with the peripheral surface of the external drum 17 to maintain such at freezing temperature for chilling plastic substances in a manner that will appear more fully hereinafter. A plurality of circular divider or partition plates 23 are provided in the refrigerant chamber 18 to serve as a spacer between the drums 17 and 19. Circumferentially spaced apertures 24 are provided in the partition plates 23 to permit the circulation of the refrigerant throughout the chamber 18.

It will be apparent that the shaft 14 may have threaded couples fixed to the extremities thereof to enable the connection of the refrigerant supply thereto as well as the recirculation thereof in a manner that is well known in the art. The sides 20 of the external drum 17 are preferably provided with sheets of insulation material so formed as to direct, concentrate and transmit the refrigerant through the chamber 18 and against the interior peripheral surface 25 of the drum 17 along the exterior of which the plastic substances are in adhering contact. The refrigerated surface of the drum 17 chills the substance adhering thereto to effect their solidification as the drum 17 rotates. The non-rigid substances are conveyed to the peripheral surface of the refrigerated drum 17 for adherence thereto in effecting their conversion from a liquid or plastic state to a solid.

The substances are supplied to the peripheral surface of the external drum 17 by an endless conveyor belt 26 which traverses over end pulleys 27 fixed to shafts 28. The shafts 28 are journalled in a conveyor frame unit 29 which is supported by the standards 11. Intermediate rollers 30 are journalled in the frame unit 29 to support the conveyor belt 26 with the substance to be chilled for conveyance thereon to the exterior of the refrigerated drum 17. The rollers 30 are journalled in notches 31 provided in the upstanding edges 32 of the conveyor frame unit 29 that supports the conveyor belt 26. The conveyor belt 26 is actuated for linear displacement so as to feed the substance in the direction of the drum 17, thereby requiring the end pulley to rotate in a clockwise direction (viewed from Figure 1).

The frame unit 29 has upstanding sides 33 to confine the edible substance on the conveyor belt 26 as it is directed to the drum 17. The side members 33 are attached to upstanding brackets 34 fixed or anchored to the conveyor frame member 29. A pair of confronting blocks 35 and 36 are pivotally attached to rods 37 having coiled spring 38 in enveloping relation therewith. The rods 37 with their enveloping springs 38 are positioned in inclined slots 39 provided in the side members 33 so as to yieldingly urge the confronting blocks 35 and 36 toward the periphery of the drum 17. The confronting blocks 35 and 36 have inclined converging surfaces 40 and 41 that extend to the side members 33 so as to narrow the path of substance movement as the conveyor belt 26 approaches the drum 17.

The springs 38 will urge the blocks 35 and 36 in engagement with the drum 17 and the converging surface 41 thereof will permit delivery thereof upon the surface of the drum 17 without any of the substance becoming dislodged from the path of travel. In order to transfer the substance from the conveyor belt 26 to the periphery of the refrigerated drum 17 in a uniform layer of any desired thickness, a transfer device or pan 42 is disposed a short distance below the surface of the drum 17 and adjacent the conveyor belt 26 so as to define the path of travel for the substances beyond the conveyor unit 29. To this end, the transfer device 42 consists of a substantially rectangular metallic plate 43 which is curved to correspond with the periphery of the drum 17 and has an edge 44 in scraping engagement with the surface of the conveyor belt 26. The plate 43 extends rearwardly for a distance sufficient to insure that a uniform layer of the substance 45 will adhere to the periphery of the drum by virtue of its refrigeration sufficient to give chilling adhesion of the substance 45 thereto.

As shown, the transfer plate 43 terminates in a slightly curved rearward edge 46 to permit the chilled substances 45 to travel therebeyond in uniform layer adhesion to the drum 17 as it rotates in a counter-clockwise direction (viewed from Figures 1 and 4). The transfer plate 43 constitutes the top surface of a pan 47 that is attached thereto to define a chambered interior 48 for the reception of the warm water that enters through a pipe 49 and is connected to an intake 50 through a flexible hose 51. A discharge pipe 52 communicates with the chamber 48 to discharge the warm water that circulates therethrough, thereby maintaining the transfer plate 43 at a somewhat higher temperature than the surrounding atmosphere, but at a temperature that is considerably above the refrigerated drum 17 to permit the substance 45 to pass therethrough without adhesion or friction so far as the transfer plate 43 is concerned.

The transfer plate 43 merely serves to apply the substance as it is discharged from the conveyor belt 26 to the surface of the drum 17 for adhesion thereto and displacement over the transfer plate 43 without any appreciable frictional reaction. The transfer device 43 is supported by a plate 53 having upstanding sides 54 which extend upwardly for attachment to the cross-beam 13 (Figure 1). A bracket 55 is fixed on the plate 53 to carry a lever 56 pivoted thereto for counterclockwise support (viewed from Figure 4) by a stud 57 in threaded engagement with the support plate 53 and extending therethrough to engage the lever 56 and serve as an adjustable support therefor. The lever 56 engages a transverse rod 58 extending in a furcated bearing 59 carried by a rod 60.

The rod 60 is pivotally anchored to the side plate of the conveyor frame 39 so as to retain the edge 44 of the transfer plate 43 against the surface of the conveyor belt 26 and to move as a unit with the conveyor frame unit 29 which is horizontally adjustable as will appear more fully hereinafter. A weight 62 is preferably attached to the forward portion of the pan 47 so as to normally gravitate the transfer plate 43 in a counterclockwise direction (viewed from Figure 4) and to retain its scraping edge in contact with the conveyor belt 26 so as to effectively remove the substance 45 to be treated therefrom. The distance of the transfer plate 43 with respect to the periphery of the drum 17 predetermines the thickness of the substance layer 45, this being adjustable through the medium of the studs 57 that elevate or lower the pan 47 and which is movable forwardly or rearwardly with the conveyor unit 29 through the lever 63.

The lever 63 is pivoted for attachment to a shaft 64 having an offset eccentric 65 at each end thereof for attachment of the conveyor belt frame 29 and the transfer pan 47. An arcuate strap 66 is anchored to the conveyor frame so that the lever 63 is pivotal relative thereto and to afford its attachment against movement in any adjusted position. The lever 63 will, thereupon, move the conveyor frame unit 29 forwardly or rearwardly so as to be positioned closer to or further from the refrigerated drum 17 to determine the thickness of the substance layer 45 as it traverses over the transfer plate 43.

Suitable scoring wires 67 may be anchored to the rod 68 positioned adjacent the refrigerated drum 17 beyond the transfer pan 47 so as to assist in applying the substance layer 45 as it moves beyond the transfer plate 43. The shaft 68 is fixed to a plate 69 (Figure 1) having an arcuate slot 70 therein to receive a threaded stud 71 anchored to the upstanding sides 54 of the transfer pan supporting plate 53. This affords the arbitrary adjustment of the shaft 68 responsive to the positioning of the plate 69 relative to the stud 71 to control the movement of the scoring wires 67 against the periphery of the refrigerated drum 17. It is to be noted that the temperature of the water circulating through the pan 47 may be varied in that the hot and cold water supply pipes 72 and 73, respectively, communicate with a mixing control valve 74 provided in the pipe line 49 that preferably though not essentially has a temperature indicator 75 connected thereto (Figure 1).

In order to remove the chilled substance as such rotates with the surface of the drum 17, a scraper mechanism 76 is fixed to the vertical standard 11 so that its sharp edge 77 will be in engagement with the periphery of the drum 17 to remove the chilled substances therefrom. The scraping mechanism 76 preferably consists of a chambered member preferably having a triangular cross-section to present the sharp scraping edge 77 against the surface of the refrigerated drum. Cold water is circulated through the interior of the scraper mechanism 76 by means of an intake pipe 78 connected therewith, the cold water being discharged through a pipe 79 so as to slightly soften the chilled substances to facilitate its scraping removal from the surface of the drum 17 and providing for its discharge into a conveyor unit 80 mounted by means of brackets 81 to the vertical standards 11. The conveyor unit 80 has a hopper 82 along the width of the drum 17 to receive the chilled substances from the scraper mechanism 76.

A plurality of scoring wires 83 are fixed to the scraper mechanism 76 to extend in the direction of and engage with the surface of the drum 17 so as to divide the chilled substance into ridges prior to their discharge into the conveyor hopper 82. It is worthy of note that the transfer plate 43 is an important instrumentality for providing a uniform layer of the substance upon the refrigerated drum 17 as such leaves the conveyor belt 26 for freezing. The temperature of the transfer plate 43 may be carefully regulated so as to effectively provide for the initial application of the substance to the refrigerated drum without waste and in such thickness that may be regularly controlled by an attendant without entailing any appreciable labor, time or interruption to the chilling operation.

Further, it is to be noted that the discharge conveyor 80 may convey the chilled substance to any desired treating machine for packing, conversion or wrapping as conditions may require and the particular substance or production may afford. Some of the edible substances that are effectively chilled with the instrumentalities described supra are butter, shelled eggs, lard, cottonseed oil, oleo margarine, liquids and plastic edibles that require conversion and preserving.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a chilling mechanism, the combination with means for feeding non-rigid edible substances along a predetermined path, of chilling means for effecting the traverse of said substances beyond said path to convert edible substances to a chilled rigid solid state, and temperature controlled means interposed between said feeding and chilling means to effect the transfer of the substances from said feeding means to said chilling means.

2. In a chilling mechanism, the combination with means for feeding non-rigid edible substances along a predetermined path, of chilling means for effecting the traverse of said substances beyond said path to convert edible substances to a chilled rigid solid state, means interposed between said feeding and chilling means to effect the transfer of the substances from said feeding means to said chilling means, said last named means having an edge thereof in effective scraping engagement with said feeding means for removing the substances therefrom, and means for controlling the temperature of said last named means to facilitate the transfer of the substance from said feeding means to said chilling means.

3. In a chilling mechanism, the combination with means for feeding edible substances along a predetermined path, of chilling means for effecting the traverse of said substances beyond said path to convert edible substances to a chilled solid state, rigid means interposed between said feeding and chilling means to effect the transfer of the substances from said feeding means to said chilling means, said last named means having an edge thereof in effective scraping engagement with said feeding means for removing the substances therefrom, and means for adjusting said transfer means relative to said chilling means for controlling the transfer of substances thereto.

4. In a chilling mechanism, the combination with means for feeding edible substances along a predetermined path, of chilling means for effecting the traverse of said substances beyond said path to convert edible substances to a chilled solid state, rigid means interposed between said feeding and chilling means to effect the transfer of the substances from said feeding means to said chilling means, and means on said transfer means for maintaining an edge thereof in effective scraping engagement with said feeding means.

5. In a chilling mechanism, the combination with means for feeding edible substances along a predetermined path, of chilling means for effecting the traverse of said substances beyond said path to convert edible substances to a chilled solid state, rigid means interposed between said feeding and chilling means to effect the transfer of the substances from said feeding means to said chilling means, means on said transfer means for maintaining an edge thereof in scraping engagement with said feeding means, and means for subjecting said transfer means to a tempering fluid to elevate the temperature thereof above the temperature of the surrounding atmosphere.

6. In a chilling mechanism, the combination with means for feeding edible substances along a predetermined path, of chilling means for effecting the traverse of said substances beyond said path to convert edible substances to a chilled solid state, rigid means interposed between said feeding and chilling means to effect the transfer of the substances from said feeding means to said chilling means, means on said transfer means for maintaining an edge thereof in scraping engagement with said feeding means, and means for circulating a tempering fluid through said transfer means to minimize the frictional reaction of substances therewith.

7. In a chilling mechanism, the combination with means for feeding edible substances along a predetermined path, of chilling means for effecting the traverse of said substances beyond said path to convert edible substances to a chilled solid state, rigid means interposed between said feeding and chilling means to facilitate the transfer of the substances from said feeding means to said chilling means, and means on said transfer means for maintaining an edge thereof in scraping engagement with said feeding means, said transfer means having a surface extension in spaced relation with said chilling means to insure the adhesive association of the substances thereon.

8. In a chilling mechanism, the combination with means for feeding edible substances along a predetermined path, of chilling means for effecting the traverse of said substances beyond said path to convert edible substances to a chilled solid state, rigid means interposed between said feeding and chilling means to facilitate the transfer of the substances from said feeding means to said chilling means, means on said transfer means for maintaining an edge thereof in scraping engagement with said feeding means, said transfer means having a surface extension in spaced relation with said chilling means to insure the adhesive association of the substances thereon, and means for removing the solidified substance from said chilling means.

9. In a chilling mechanism, the combination with means for feeding edible substances along a predetermined path, of chilling means for effecting the traverse of said substances beyond said path to convert edible substances to a chilled solid state, means interposed between said feeding and chilling means to effect the transfer of the substances from said feeding means to said chilling means, means on said transfer means for maintaining an edge thereof in scraping engagement with said feeding means, said transfer means having a surface extension in spaced relation with said chilling means to insure the adhesive association of the substances thereon, substance scoring means confronting said chilling means, and means for removing the solidified substance from said chilling means.

10. In a chilling mechanism, the combination with means for feeding edible substances along a predetermined path, of chilling means for effecting the traverse of said substances beyond said path to convert edible substances to a chilled solid state, means interposed between said feeding and chilling means to effect the transfer of the substances from said feeding means to said chilling means, means on said transfer means for maintaining an edge thereof in scraping engagement with said feeding means, said transfer means having a surface extension in spaced relation with said chilling means to insure the adhesive association of the substances thereon, substance scoring means confronting said chilling means, scraping means for removing the solidified substance from said chilling means, and means for elevating the temperature of said scraping means to more effectively remove the substance from said chilling means.

11. In a chilling mechanism, the combination with means for feeding edible substances along a predetermined path, of chilling means for effecting the traverse of said substances beyond said path to convert edible substances to a chilled solid state, means interposed between said feeding and chilling means to effect the transfer of the substances from said feeding means to said chilling means, means on said transfer means for maintaining an edge thereof in scraping engagement with said feeding means, said transfer means having a surface extension in spaced relation with said chilling means to insure the adhesive association of the substances thereon, substance scoring means confronting said chilling means, scraping means for removing the solidified substance from said chilling means, and means for circulating a tempering fluid through said scraping means to more effectively remove the substances from said chilling means.

12. In a chilling mechanism, the combination with means for feeding non-rigid edible substance along a predetermined path, of chilling means for effecting the traverse of said substances beyond said path to convert edible substances to a chilled rigid solid state, temperature controlled means interposed between said feeding and chilling means to facilitate the transfer of the substances from said feeding means to said chilling means, said last named means having an edge thereof in scraping engagement with said feeding means for removing the substances therefrom, and means for adjusting said feeding means and transfer means relative to said chilling means.

13. In a chilling mechanism, a transfer device for normally non-rigid substances, the combination with a solid plate, of a receptacle having the open side thereof secured to said plate to define a closed chamber, and a pair of conduits communicating with the interior of said chamber to provide for the circulation of a tempering fluid therethrough.

14. In a chilling mechanism, a transfer device for normally non-rigid substances, the combination with a solid plate, of a receptacle having the open side thereof secured to said plate to define a closed chamber, and a pair of conduits communicating with the interior of said chamber to provide for the circulation of a tempering fluid therethrough, said plate extending beyond said receptacle to define a scraper edge.

15. In a chilling mechanism, a transfer device for normally non-rigid substances, the combination with a solid plate, of a receptacle having the open side thereof secured to said plate to define a closed chamber, and a pair of conduits communicating with the interior of said chamber to provide for the circulation of a tempering fluid therethrough, said plate extending beyond said receptacle to define a scraper edge on the substance entrance side thereof and a substance guide on the discharge side thereof.

16. A chilling mechanism for normally non-rigid substances comprising a cylindrical external drum having closed ends, of a smaller internal cylindrical member of corresponding shape disposed within said external drum to define a peripheral refrigerant chamber, and a pair of conduits communicating with said chamber to circulate a refrigerant therethrough.

17. A chilling mechanism for normally non-rigid substances comprising a cylindrical external drum having closed ends, of a smaller internal cylindrical member of corresponding shape disposed within said external drum to define a peripheral refrigerant chamber, a plurality of circular plates circumferentially disposed in said chamber to serve as spacers between said internal and external drums, and a pair of conduits communicating with said chamber to circulate a refrigerant therethrough.

18. A chilling mechanism for normally non-rigid substances comprising a cylindrical external drum having closed ends, of a smaller internal cylindrical member of corresponding shape disposed within said external drum to define a peripheral refrigerant chamber, a plurality of circular plates circumferentially disposed in said chamber to serve as spacers between said internal and external drums, said spacer plates having apertures therein to enable the circulation of the refrigerant through said chamber, and a pair of conduits communicating with said chamber to circulate a refrigerant therethrough.

CHARLES DOERING.